United States Patent
Everts et al.

[11] Patent Number: 6,148,523
[45] Date of Patent: *Nov. 21, 2000

[54] LINE FEED MECHANISM FOR A LINE TRIMMER

[75] Inventors: Robert G Everts; Harold J Coleman, both of Chandler; Harry G Rickard, Phoenix, all of Ariz.

[73] Assignee: Ryobi North America, Inc., Anderson, S.C.

[*] Notice: This patent is subject to a terminal disclaimer.

[21] Appl. No.: 09/125,302
[22] PCT Filed: Feb. 14, 1997
[86] PCT No.: PCT/US97/02680
§ 371 Date: Aug. 14, 1998
§ 102(e) Date: Aug. 14, 1998
[87] PCT Pub. No.: WO97/29627
PCT Pub. Date: Aug. 21, 1997
[51] Int. Cl.[7] .................................................. A01G 3/06
[52] U.S. Cl. ................................................ 30/276; 30/347
[58] Field of Search ....................... 30/276, 347; 56/12.7, 56/295, 12.5

[56] References Cited

U.S. PATENT DOCUMENTS

| | | |
|---|---|---|
| 4,035,912 | 7/1977 | Ballas et al. . |
| 4,052,789 | 10/1977 | Ballas, Sr. . |
| 4,067,108 | 1/1978 | Ballas . |
| 4,151,646 | 5/1979 | Lane . |
| 4,177,561 | 12/1979 | Ballas . |
| 4,271,595 | 6/1981 | Rahe . |
| 4,335,510 | 6/1982 | Close et al. . |
| 4,475,287 | 10/1984 | Beihoffer . |
| 4,483,069 | 11/1984 | Moore . |
| 4,805,306 | 2/1989 | Baba . |
| 4,819,333 | 4/1989 | Baba . |
| 4,835,867 | 6/1989 | Collins et al. . |
| 4,852,258 | 8/1989 | Foster . |
| 4,882,843 | 11/1989 | Baba . |
| 5,293,692 | 3/1994 | Sugihara et al. . |
| 5,295,306 | 3/1994 | Sugihara et al. . |
| 5,461,787 | 10/1995 | Araki et al. . |
| 5,490,641 | 2/1996 | Worthing . |
| 5,659,960 | 8/1997 | Everts et al. ............................. 30/276 |
| 5,671,536 | 9/1997 | Everts et al. ............................. 30/276 |
| 5,806,192 | 9/1998 | Everts et al. ............................. 30/276 |

*Primary Examiner*—Douglas D Watts
*Attorney, Agent, or Firm*—Brooks & Kushman P.C.

[57] ABSTRACT

A line trimmer head (10) includes a line feed configuration which facilitates reloading the head (10) with new line without requiring removal of the spool (24) from the housing. Line (18) is sequentially fed first into the housing through a peripheral opening (20) in the housing, through a guide channel (84, 86) in the spool, and then out of the housing beyond a lower flange (26) of the spool through an opening in the hub (98) of the spool. Finally, the line is fed into a small opening in a spool flange (94) to secure the line with respect to the spool. Rotation of the spool then 46 causes the line to be drawn into the housing through the peripheral opening and wrapped around the spool. The spool provides separate storage compartments (38, 40) for different lines. Additional payout of line is provided when a bump knob is bumped on the ground surface.

18 Claims, 12 Drawing Sheets

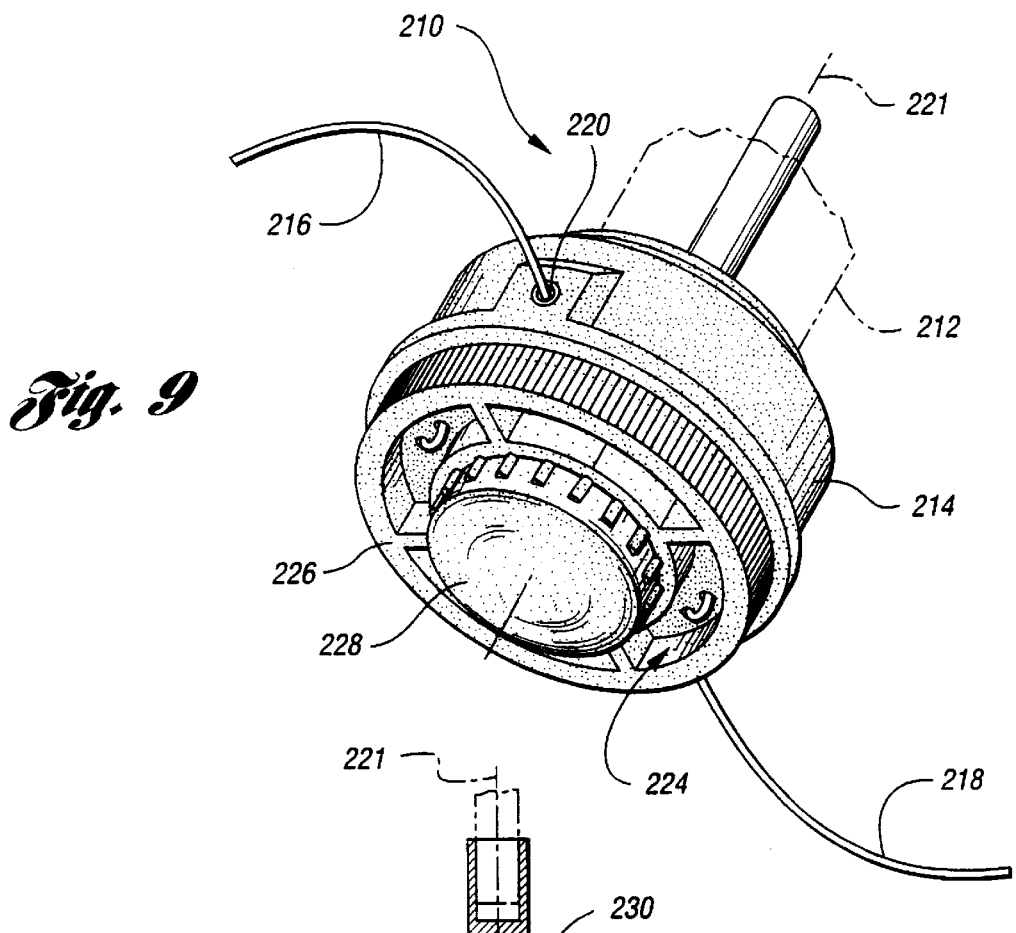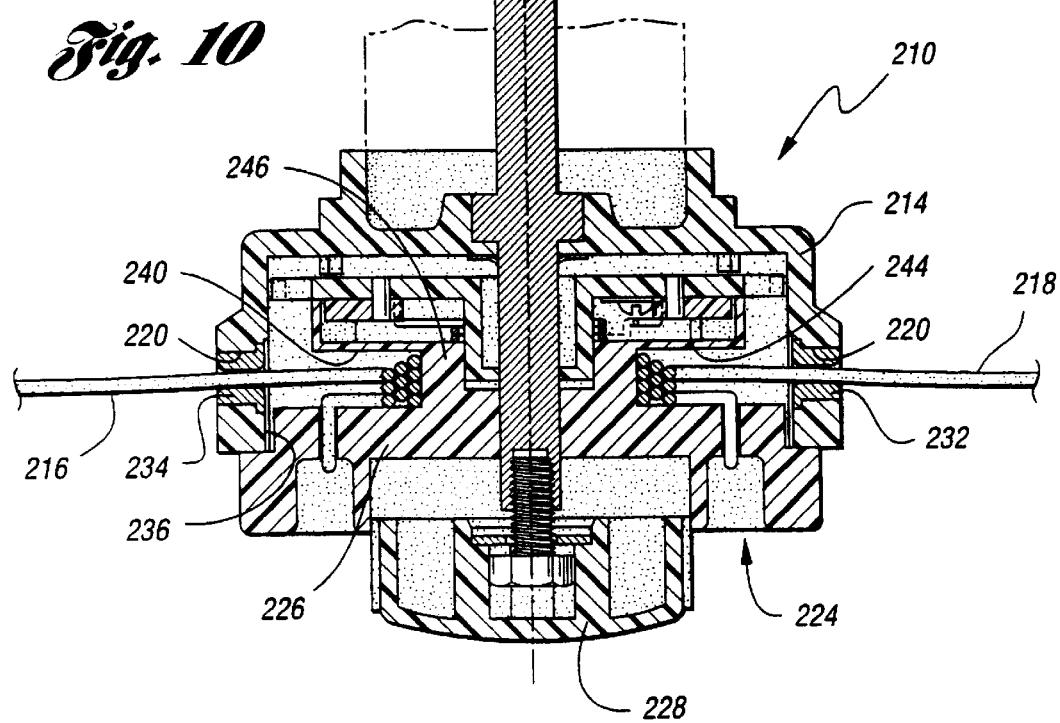

LINE FEED MECHANISM FOR A LINE TRIMMER

TECHNICAL FIELD

The present invention relates to vegetation cutting line trimmers, and more particularly to a linefeed mechanism for a line trimmer.

BACKGROUND ART

Typically, reloading fresh line into a line trimmer head is a difficult and time consuming process. Reloading line onto the spool requires removal of the spool, and other components, which can be awkward.

First, the bump knob must be removed. This can be difficult when the bump knob has become tight as a result of normal use. Once the bump knob is removed, the spool and spring are removed from the housing. In order to load the line, the line must be secured to the hub and carefully wrapped around the spool. If the line is not tightly held while wrapping, it can release and quickly unwind from the spool. When the line is fully wrapped around the spool, the spring must be held closely adjacent the spool for insertion onto the drive shaft. As the spool and spring are inserted into the housing, the cutting ends of the line must be fed through a pair of eyelets in the housing as the line is carefully held in its wrapped position about the spool. Once the line is through the eyelets and the spool is inside the housing, the bump knob is replaced to secure the spool in position.

It is desirable to provide a line trimmer with a line feed configuration which does not require the installer to handle a variety of components while reloading the spool with new line.

This line assembly process may be difficult and time consuming because the installer is required to simultaneously hold the line, spool, spring and housing while feeding the line through the eyelets and carefully holding the line in its wrapped position about the spool to prevent the line from "coughing up" and releasing from the spool.

Another problem experienced in prior art designs is rubbing together of opposing lines which causes the lines to weld together while housed on the spool.

SUMMARY OF THE INVENTION

The present invention avoids the above referenced problems experienced in prior art assemblies by providing a line trimmer head which does not require removal of the spool from the housing for reloading new line onto the spool. The line is received into the housing through an eyelet on the housing and is secured in a hole formed on a flange of the spool. Accordingly, the line may be wound around the spool while the spool remains inside the housing.

In an alternative embodiment, the line is received into the housing through an eyelet on the housing and secured in a pair of holes formed on a flange of the spool.

Welding of opposing lines together is avoided by providing a spool with separate line storage compartments.

In another embodiment, the line is easily wound about the spool while the spool remains in the housing by providing a spool subassembly, which includes a spool, a cog ring connected to the spool, and a ratchet and pawl assembly formed between the spool and cog ring to allow relative rotation of the spool and cog ring in one direction for winding, while preventing opposite rotation to facilitate line-feed bumping and line trimming operations.

In a further embodiment, the spool assembly includes a pawl integrally molded with one of the spool and cog ring, and a ratchet member integrally molded with the other of the spool and cog ring, thereby eliminating the spring/pawl assembly as separate components.

An object of the present invention is to provide a line trimmer head which may be reloaded with flexible line without removing the spool from the head.

Another object of the present invention is to provide a line trimmer head with separate compartments for storage of individual flexible lines.

Another object of the present invention is to provide a line trimmer head which is inexpensive to manufacture, durable and easy to reload with flexible line.

A further object of the present invention is to provide a speed-spool, line winding spool subassembly which allows spool rotation in one direction for winding while the spool is in the housing while preventing spool rotation in an opposing direction to facilitate linefeed bumping and line trimming operations.

Yet another object of the present invention is to provide a speed-spool assembly which eliminates the spring and pawl as separate components.

The above objects and other objects, features and advantages of the present invention are readily apparent from the following detailed description of the best mode for carrying out the invention when taken in conjunction with the accompanying drawings.

BRIEF DESCRIPTION OF THE DRAWINGS

FIG. 9 shows a perspective view of a line trimmer head in accordance with a second alternative embodiment of the present invention;

FIG. 10 shows a vertical cross-sectional view of a line trimmer head in accordance with the embodiment shown in FIG. 9;

DETAILED DESCRIPTION OF THE PREFERRED EMBODIMENTS

Figure 1:
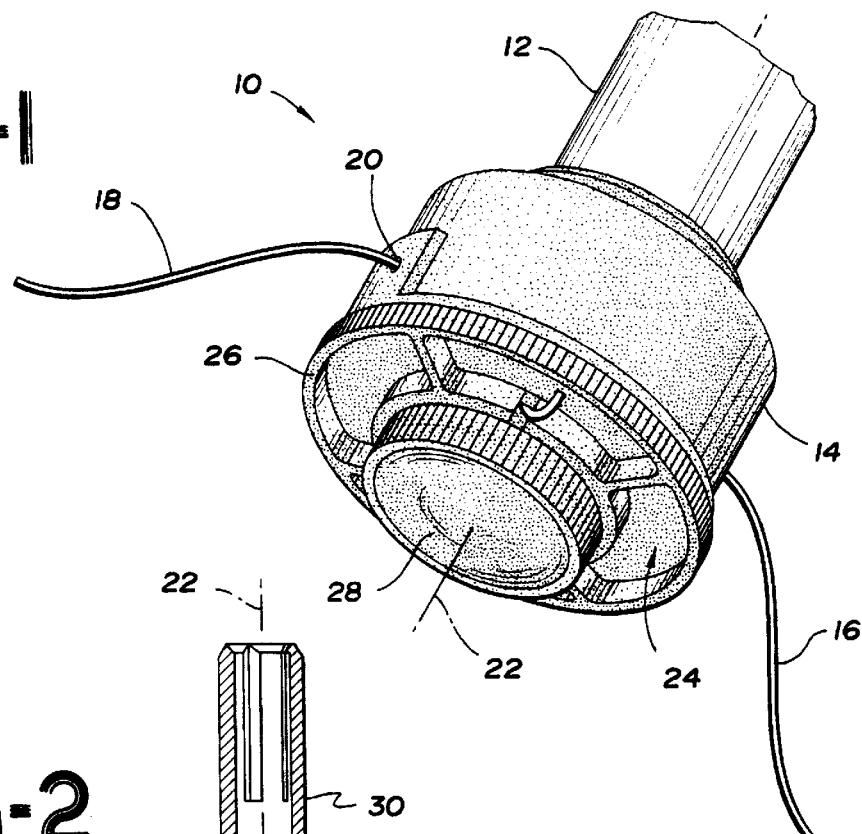
FIG. 1 shows a perspective view of a line trimmer head in accordance with the present invention.

Referring to FIG. 1, a line trimmer head 10 is shown in accordance with the present invention. The line trimmer head 10 is connected to a support shaft 12 and includes a housing 14. Flexible lines 16,18 extend from a pair of peripheral openings 20 formed in the housing 14 and are stored within the housing 14. The flexible lines 16,18 extend from the line trimmer head 10 for cutting vegetation. The line trimmer head 10 rotates about the central axis 22 to rotate the flexible lines for cutting.

The line trimmer head 10 includes a spool 24, having a flange 26. A bump knob 28 extends below the spool 24 for engagement with a ground surface to selectively payout additional flexible line 16,18.

Figure 2:
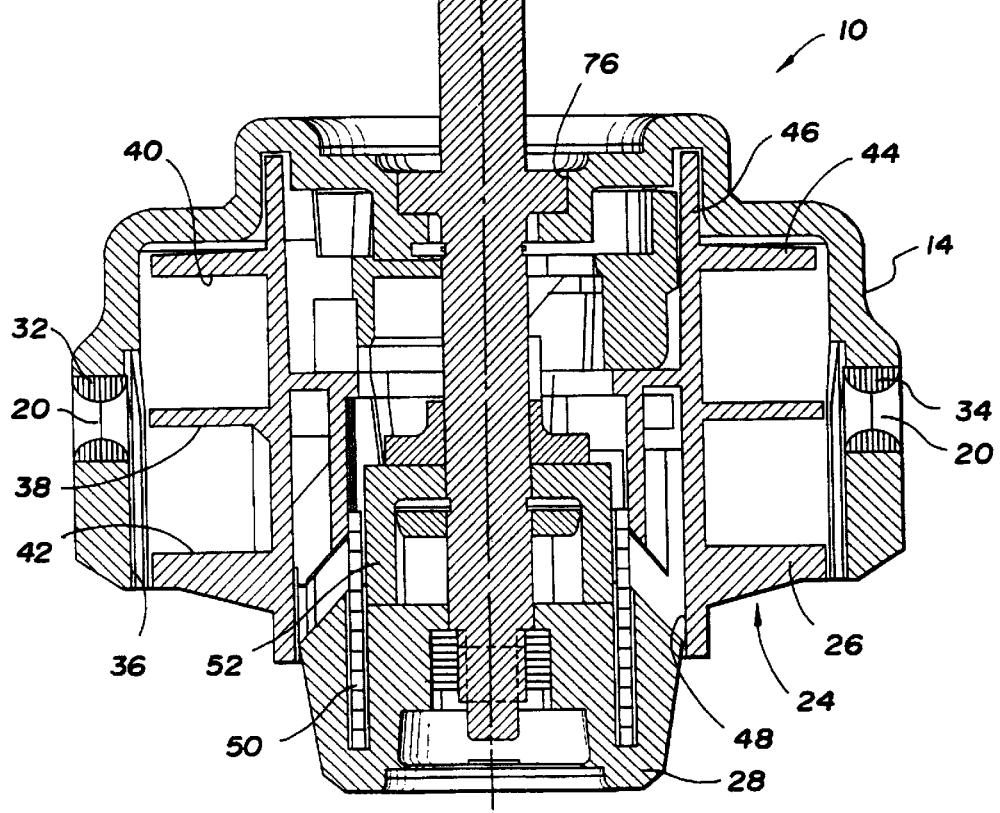
FIG. 2 shows a vertical cross-sectional view of a line trimmer head in accordance with the present invention.

Referring to FIG. 2, a vertical cross-section of the line trimmer head 10 is shown. A drive shaft 30 engages the housing 14 to cause rotation of the housing 14. The spool 24 is adapted to receive flexible line for storage thereabout. The flexible lines extend out of the housing through the pair of eyelets 32,34 in the peripheral openings 20. The spool 24 includes a lower flange 26 which is positioned adjacent the open end 36 of the housing 14. The spool 24 also includes an intermediate flange 38 which separates the spool 24 into two line storage compartments 40,42. In this configuration, the two flexible lines 16,18 are stored in the separate storage compartments 40,42 respectively. This configuration prevents welding of the lines 16,18 together as the spool 24 and housing 14 are rotated. The spool 24 also includes an upper flange 44 extending from the flange hub 46. The upper flange 44 in cooperation with the intermediate flange 38 and the hub 46 form the line storage compartment 40.

The bump knob 28 cooperates with the drive shaft 30. The bump knob 28 is movable in an aperture 48 formed in the spool 24. A spring 50 biases the bump knob 28 toward an extended position away from the spool 24. The bump knob 28 engages a sleeve 52 which is arranged concentrically about the drive shaft 30.

Figure 3:
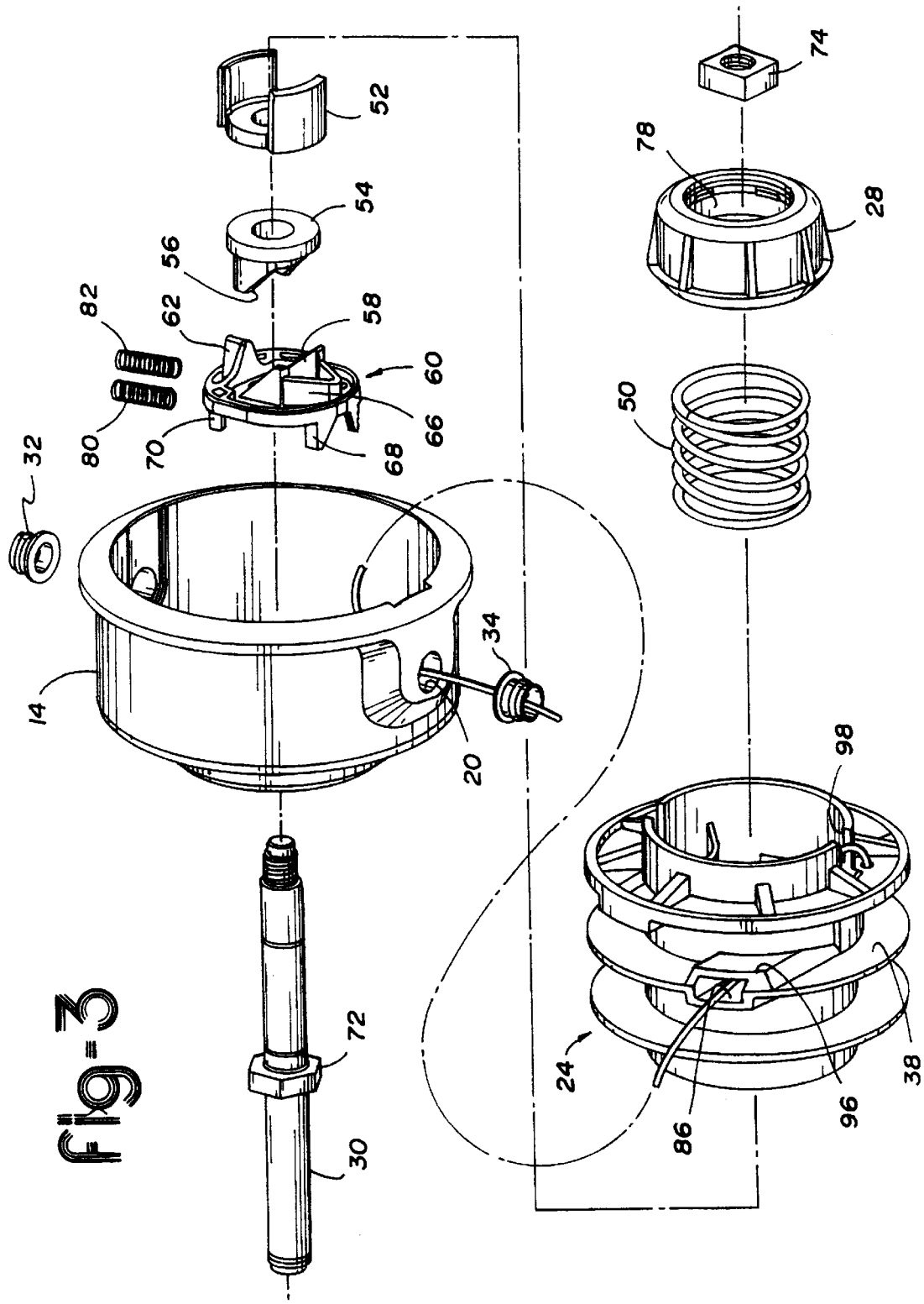
FIG. 3 shows an exploded perspective view of a line trimmer head in accordance with the present invention.

As more clearly shown in FIG. 3, the sleeve 52 engages the actuator member 54. The actuator member 54 includes a ramped surface 56, which engages a corresponding ramped surface 58 on the locking member 60 in order to move the locking member 60 laterally within the housing 14. When a user desires payout of additional flexible line 16,18, the bump knob 28 is bumped onto a ground surface, which moves the bump knob 28 axially along the drive shaft 30. The spring 50 is compressed and the sleeve 52 forces the actuator member 54 axially along the drive shaft 30. The ramped surface 56 of the actuator member 54 engages the ramped surface 58 of the locking member 60. The ramped surface 56 travels along the ramped surface 58, thereby causing the locking member 60 to move laterally within the housing 14. The locking member 60 includes a tooth 62, which is engageable with the cogs 64 (FIG. 4) on the spool 24. When the bump knob 28 is in the extended position, the tooth 62 of the locking member 60 is engaged with one of the plurality of cogs 64 on the spool 24 to lock the spool 24 for rotation with the housing 14. In this position, the spool 24 rotates with the housing 14, and the line trimmer head 10 may be used to cut vegetation.

When additional payout of the line is required, the bump head 28 is depressed, which moves the ramped surfaces 56,58 respectively, causing the locking member 60 to move laterally to disengage the tooth 62 from the cogs 64. Incremental payout of flexible line 16,18 is then allowed until the opposing ramp 66 on the locking member 60 engages one of the cogs 64, thus returning the locking member 60 to a position wherein the tooth 62 is engaged with one of the cogs 64. Accordingly, only limited payout of flexible line is permitted because the opposing ramp 66 will engage one of the cogs after a predetermined incremental rotation of the spool 24, thereby causing the locking member 60 to return.

The legs 68,70 of the locking member 60 slidably travel along slots (not shown) in the housing 14 to facilitate lateral movement of the locking member 60 within the housing 14. The springs 80,82 bias the locking member 60 toward a position of engagement between the tooth 62 and one of the cogs 64. The nuts 72,74 cooperate with the drive shaft 30 to hold the assembly together. The nut 72 cooperates with an aperture 76 (FIG. 2) in the housing 14, and the nut 74 cooperates with an aperture 78 in the bump knob 28.

Figure 4:
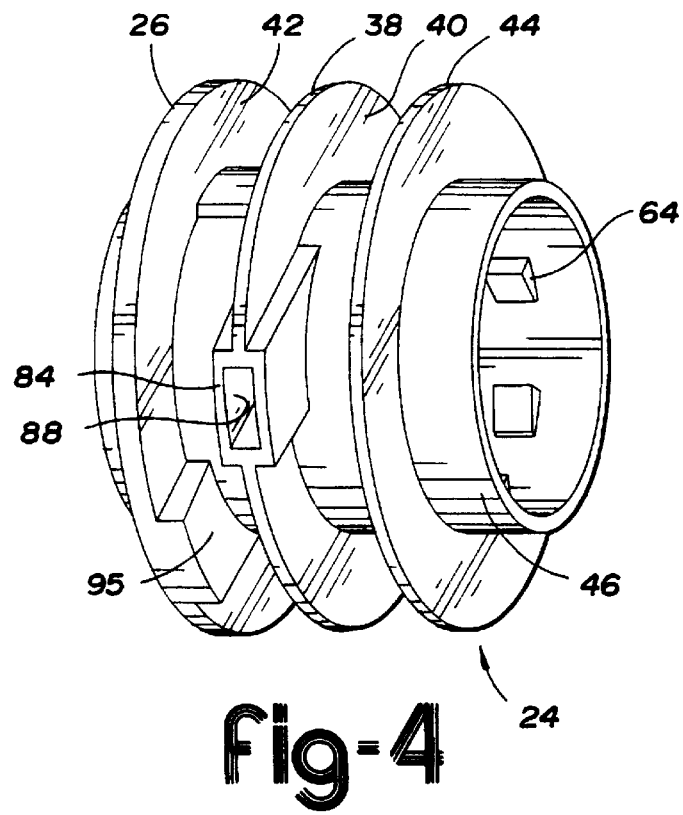
FIG. 4 shows a perspective view of a line trimmer head spool in accordance with the present invention.
Figure 5:
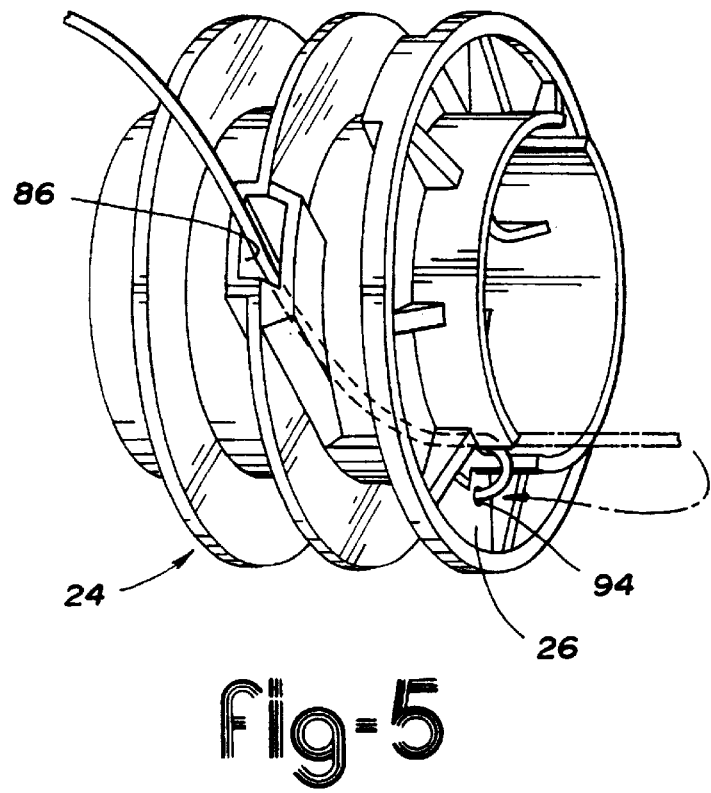
FIG. 5 shows a perspective view of a line trimmer head spool in accordance with the present invention.
Figure 6:
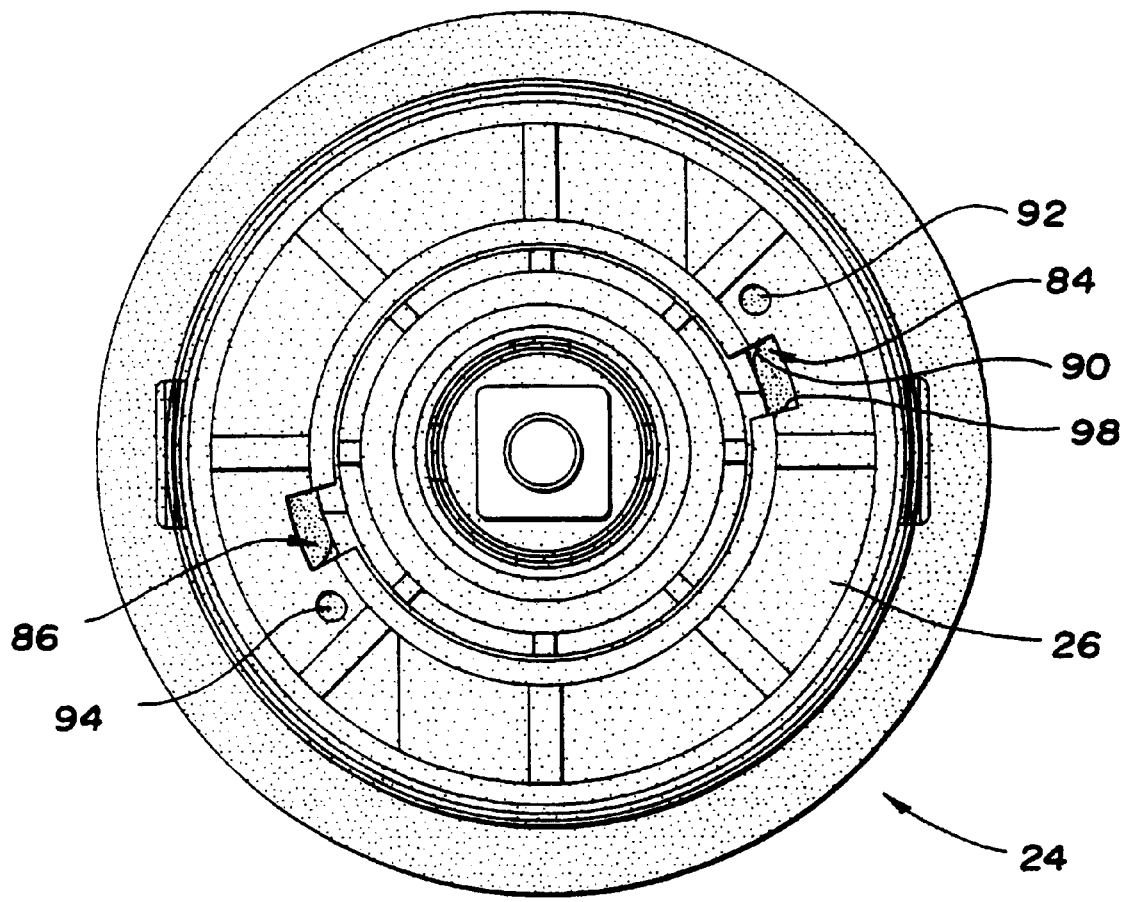
FIG. 6 shows a top plan view of a line trimmer head spool in accordance with the present invention.

The spool 24 is more clearly shown in FIGS. 4, 5 and 6. When the user wishes to insert new flexible line into the line trimmer head 10, the peripheral openings 20 (FIG. 3) are lined up with the respective guide channel 84,86 on the spool 24. The line is inserted through a peripheral opening 20 into the respective guide channel 84, which is formed on the intermediate flange 38. The guide channel 84 includes a first funnel 88 formed in the intermediate flange 38, and a curved portion 90 formed inside the hub 46 in communication with the first funnel 88 for guiding the flexible line to a position beyond the lower flange 26. The lower flange 26 includes a pair of holes 92,94 formed therethrough for receiving the flexible line. Accordingly, once the flexible line is passed through the guide channel to a position beyond the lower flange 26, the user inserts the end of the flexible line into the respective hole 92,94 in the flange 26 to secure the line with respect to the spool 24. Once the end of the line has been secured in one of the holes 92,94 the user places a finger in the finger depression 95 formed in the lower flange 26 and winds the spool 24 with respect to the housing 14 in order to draw line into the housing and wrap it around the spool. If two flexible lines are used, they will automatically be stored in the separate chambers 40,42 as a result of the sloped surfaces 96 formed on the intermediate flange 38 to guide the flexible line into the appropriate line storage compartment 40,42 upon initial winding of the spool.

Accordingly, to reload line onto the spool 24, the line is fed first into the housing through the peripheral opening 20 and into the guide channel 84 via the funnel 88. The funnel 88 guides the flexible line toward the curved portion 90 of the guide channel, which redirects the line toward the lower flange 26. The slot 98 in the hub 46 allows the line to travel from the curved portion 90 to a position beyond the lower flange 26, at which point the end of the flexible line may be inserted into the hole 92 to secure the line with respect to the spool. Then the user places a finger in the finger depression 95 and rotates the spool 24 with respect to the housing 14 in order to draw flexible line into the line storage compartments 40,42 about the hub 46. The line is then ready for cutting and the user must bump the bump knob 28 for payout of additional line when desired.

Figure 7:
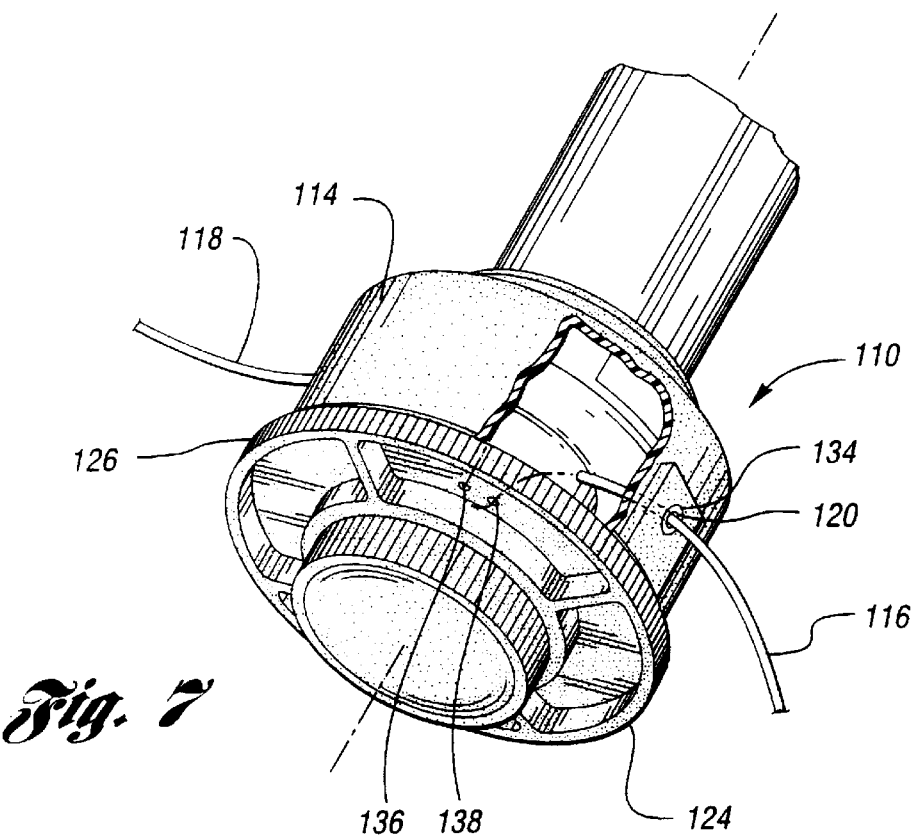
FIG. 7 shows a partially cut-away perspective view of a line trimmer head in accordance with an alternative embodiment of the present invention.
Figure 8:
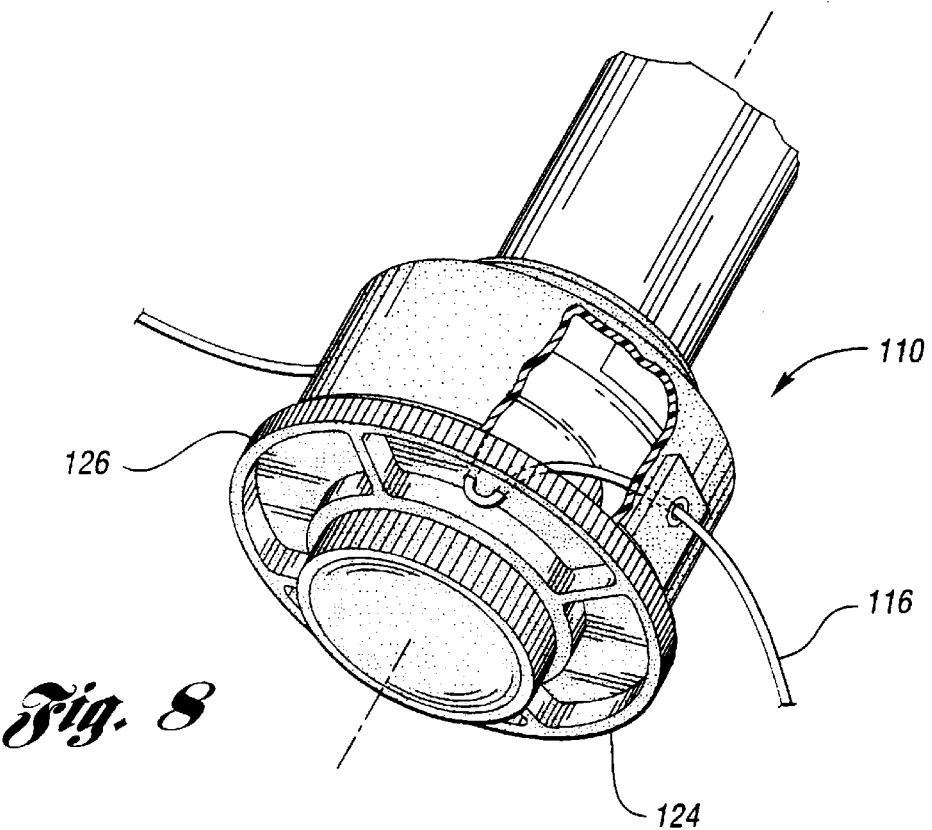
FIG. 8 shows a partially cut-away perspective view of the line trimmer head shown in FIG. 7.

Referring to FIGS. 7 and 8, an alternative embodiment is shown. Again in this embodiment, flexible line 116 may be fed into the line trimmer head 110 without removal of the spool 124. In order to reload line into the head 110, line 116 is fed through the eyelet 134 in the peripheral opening 120 of the housing 114. The line 116 is then fed up through the large opening 138 in the flange 126. The large opening 138 is in communication with both the small opening 136 of the flange and the peripheral opening 120 of the housing. Finally, the line 116 is inserted through the small opening 136 in the flange 126. The other end of the line 116 is then tugged to secure the line within the small and large opening 134,136. The user then grips the serrated portions of the flange 126 in order to rotate the spool 124 to wind the line 116 about the spool 124. As shown in FIGS. 7–8, this embodiment includes only a single spool, and does not include the guide channels disclosed with respect to the first embodiment of the present invention.

Turning to FIGS. 9–16, a second alternative embodiment of the present invention is shown. In this embodiment, the line trimmer head 210 is connected to the support shaft 212 and includes a housing 214. Flexible lines 216,218 extend from a pair of peripheral apertures 220 formed in the housing 214 and are stored within the housing 214. The flexible lines 216,218 extend from the line trimmer head 210 for cutting vegetation. The line trimmer head 210 rotates about the central axis 221 to rotate the flexible lines for cutting.

The line trimmer head 210 includes a spool 224, having a flange 226 extending radially outwardly from the periphery thereof. A bump knob 228 extends below the spool 224 for engagement with a ground surface to selectively payout additional flexible line 216,218.

Referring to FIG. 10, a vertical cross-section of the line trimmer head 210 is shown. The drive shaft 230 engages the housing 214 to cause rotation of the housing 214. The spool 224 is adapted to receive flexible line for storage thereabout. The flexible lines extend out of the housing through the pair of eyelets 232,234 in the peripheral openings 220. The spool 224 includes a lower flange 226 which is positioned adjacent the open end 236 of the housing 214. The spool 224 also includes an upper flange 244 extending from the flange hub 246. The upper flange 244, in cooperation with the hub 246 and lower flange 226, forms the line storage compartment 240.

Figure 11:
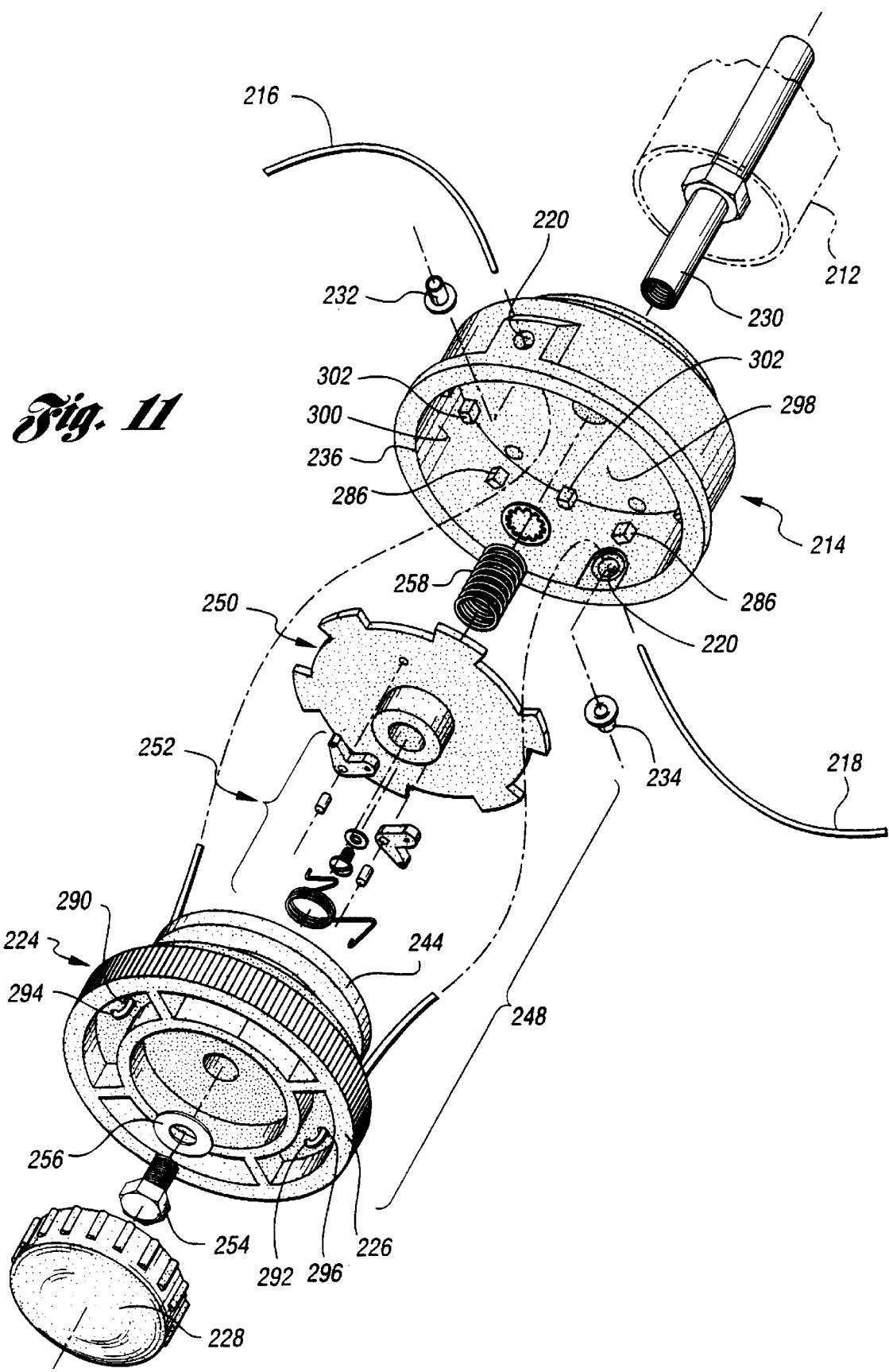
FIG. 11 shows an exploded perspective view of a line trimmer head in accordance with the embodiment shown in FIG. 9.

A spool sub-assembly 248, as shown in FIG. 11, is positioned at least partially within the housing 214 adjacent the open end 236 of the housing. The spool sub-assembly 248 comprises the spool 224, the cog ring 250 and the ratchet and pawl assembly 252. The ratchet and pawl assembly 252 allows rotation of the spool 224 in a first direction with respect to the cog ring 250 for winding line around the spool, while preventing spool rotation in a second direction opposite the first direction for line feed bumping and line trimming operations. The spool subassembly 248 is secured together by the bolt 254 and washer 256, and the subassembly 248 is spring-loaded with respect to the housing 214 by the spring 258 for line feed bumping operations, to be described below.

Figure 12:
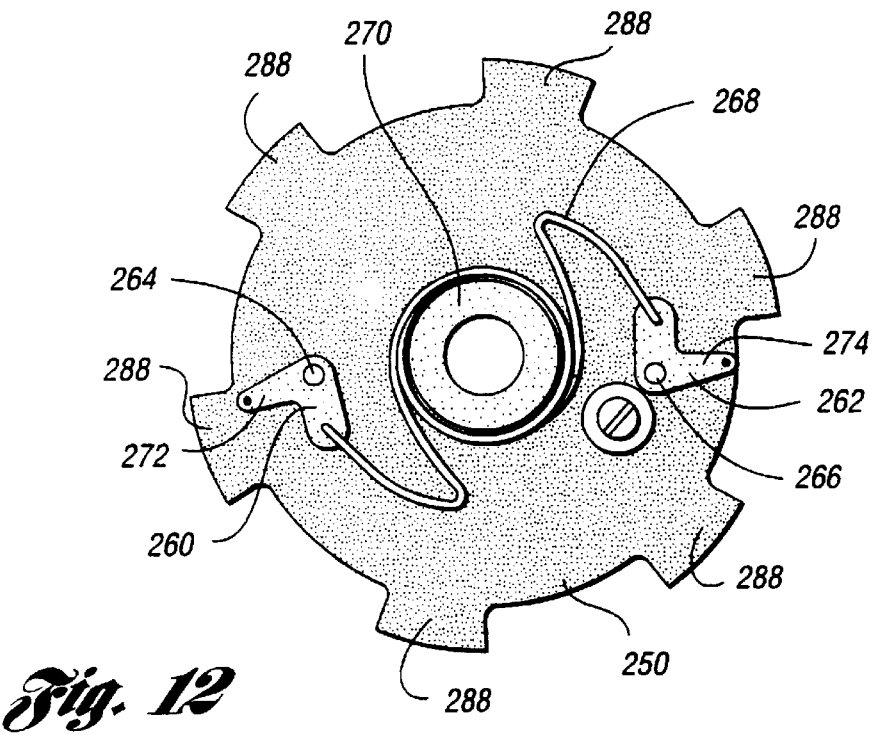
FIG. 12 shows a plan view of a cog ring and pawl assembly in accordance with the embodiment shown in FIG. 9.
Figure 13:
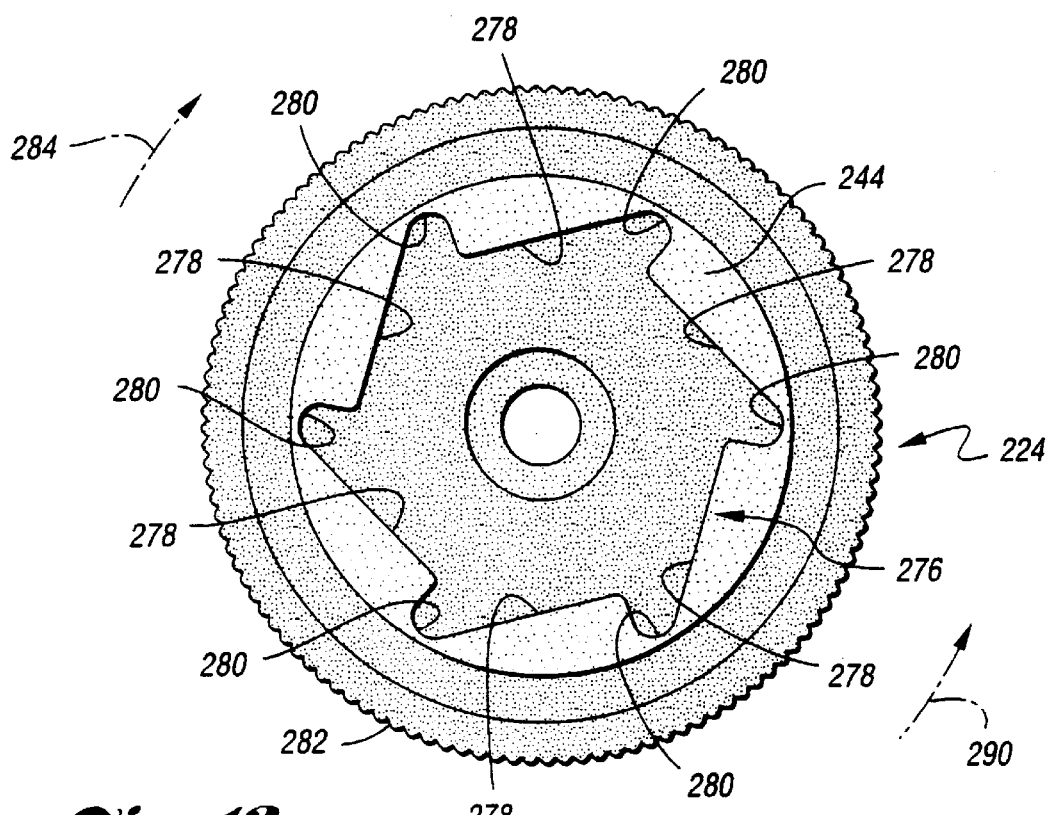
FIG. 13 shows a plan view of a spool in accordance with the embodiment shown in FIG. 9.
Figure 16:
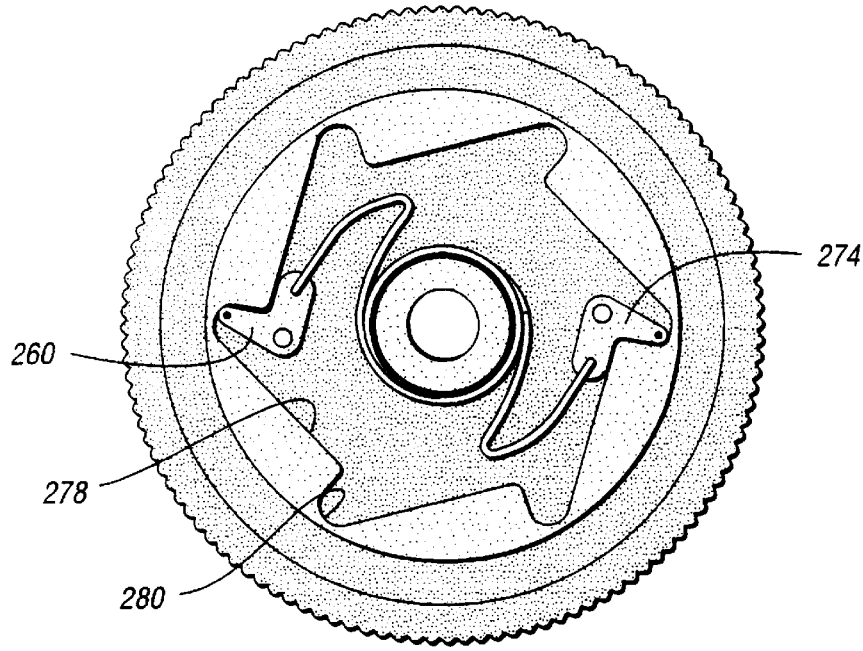
FIG. 16 shows a sectional view of a pawl assembly cooperating in accordance with the embodiment shown in FIG. 9.

The ratchet and pawl assembly 252 is more clearly understood with reference to FIGS. 12, 13 and 16. A pair of pawls 260,262 are pivotally secured to the cog ring 250 by the pivot pins 264,266. The spring 268 pivotally biases the pawls 260,262 away from the cog ring hub 270. Accordingly, the engagement portions 272,274 of the pawls 260,262 are outwardly spring-loaded to facilitate cooperation with the ratchet member 276 formed in the spool flange 244. The ratchet member 276 comprises a plurality of ramps 278 and pockets 280 which are engageable with the engagement portions 272,274 of the pawls 260,262. For winding line around the spool, the operator simply grips the serrated portion 282 of the spool 224 and rotates the spool in a first direction 284. As the spool is rotated in the first direction 284, line is wound about the spool within the line storage compartment 240. The stops 286 on the housing 214 engage the cog ring teeth 288 to prevent rotation of the cog ring 250 with respect to the housing to allow winding of the line. As the spool 224 is rotated in the first direction 284, the pawls 260,262 ride along the ramps 278 formed by the ratchet member 276 in the spool 224 in order to allow such rotation. In this manner, a "speed-spool" is provided whereby an operator may quickly wind line around the spool 224 while the spool is disposed within the housing 214.

Rotation of the spool 224 in a second direction 290 with respect to the cog ring 250 is prevented by the pockets 280. When the spool 224 begins to rotate in the second direction 290 with respect to the cog ring 250, the pawls 260,262 ride into the pockets 280 in the ratchet member 276, which prevents further rotation of the spool 224 in the second direction 290 with respect to the cog ring 250. This relative rotation prevention facilitates line feed bumping and line trimming operations.

The spool flange 226 includes a set of first holes 290,292 and a set of second holes 294,296 formed through the flange in communication with each other and in communication with the peripheral apertures in the housing to facilitate line feeding. In order to feed new line into the spool 224, the operator simply inserts flexible line 216,218 through the peripheral apertures 220 in the housing 214, as shown in FIG. 11, and further inserts the flexible line through the set of first holes 290,292 formed in the spool flange 226, and finally returns the flexible lines 216,218 into the second holes 294,296 formed in the flange 226 adjacent the respective first holes 290,292. The operator then tugs each line 216,218 to secure the line with respect to the spool, then grips the serrated portion 282 of the spool 224 and rotates the spool 224 in the first direction 284 with respect to the cog ring 250, as described above, such that the pawls 260,262 cooperate with the ramps 278 to allow such rotation and winding of the flexible line about the spool.

The self-contained spool subassembly 248 provides the advantage of being a separate subassembly manufacturing operation which provides a spool usable with existing line trimmer head housings.

Figure 14:
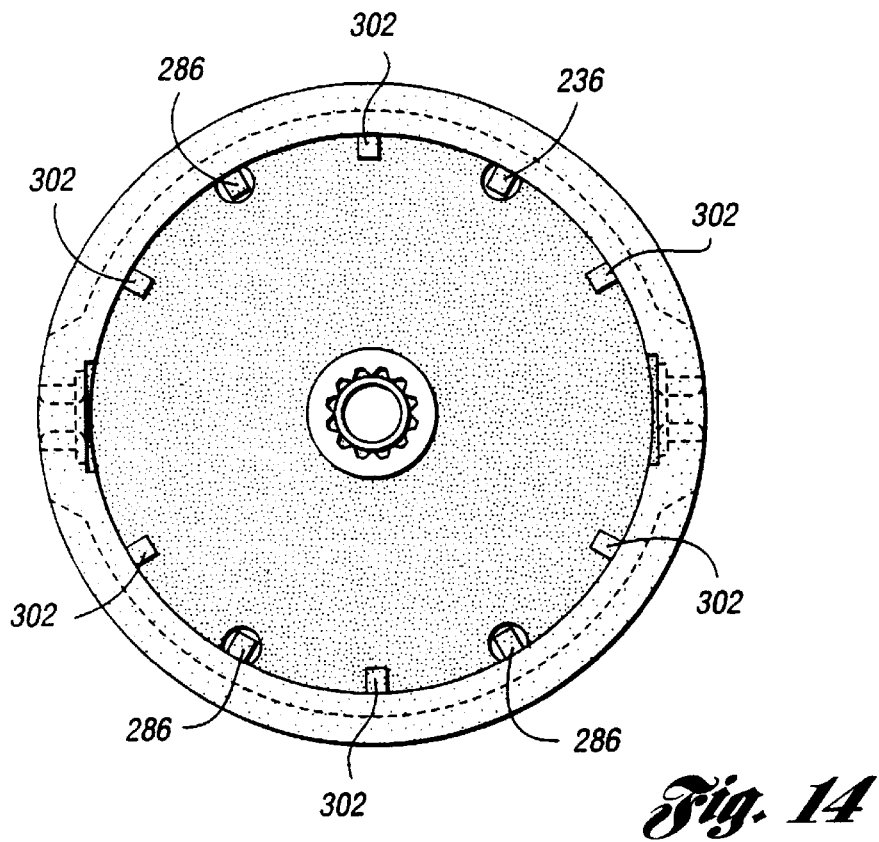
FIG. 14 shows a plan view of a spool housing in accordance with the embodiment shown in FIG. 9.
Figure 15:
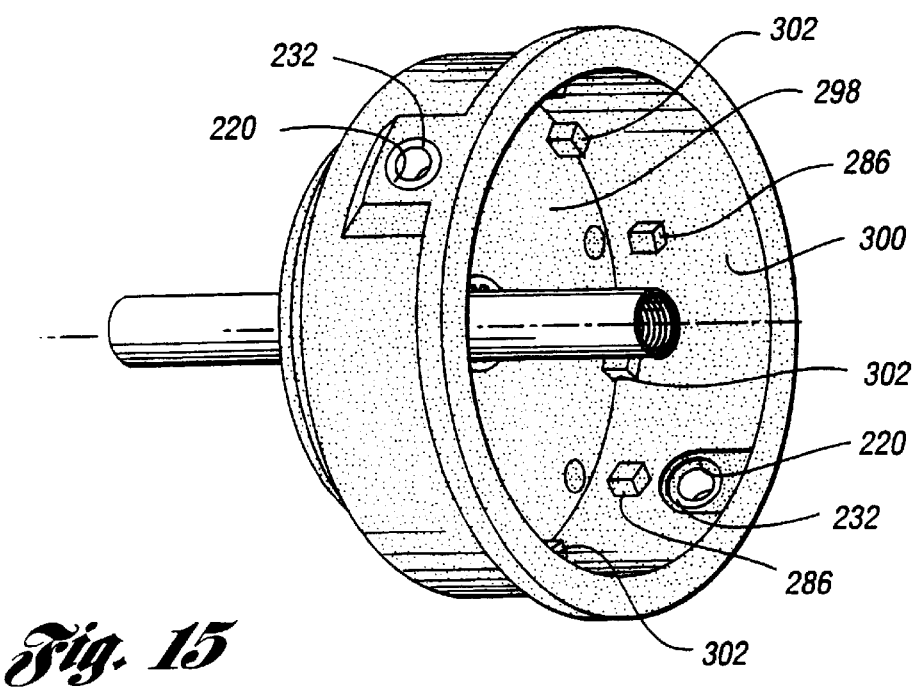
FIG. 15 shows a perspective view of a spool housing and drive rod in accordance with the embodiment shown in FIG. 9.

Line feed bumping operation is clearly understood with reference to FIGS. 11, 14 and 15. The housing 214 includes a base 298, cylindrical sidewall portion 300, a first row of stops 302 positioned inside the housing where the base and sidewall portion meet, and a second row of stops 286 positioned inside the housing 214 along the side wall portion 300 spaced from the base 298 in a manner to allow bump-actuated indexing of the cog teeth 288 between the first and second rows 302,286 of stops for dispensing incremental amounts of line from the spool.

When payout of additional flexible line from the line storage compartment 240 is desired, the operator simply bumps the bump head 228 on the ground as the line trimmer head is rotating. When the bump head 228 is bumped on the ground, the bump head 228 forces the spool subassembly 248 toward the base 298 of the housing 214. As the subassembly 248 moves toward the housing base 298, the cog teeth 288 disengage from the first row of stops 286, and the spool rotates to payout line until the cog teeth 288 engage the stops 302 to prevent further rotation. The spring 258 then forces the spool subassembly 248 away from the housing base 298 to clear the cog teeth 288 away from the stops 302, and the cog ring 250 and spool subassembly 248 continue to rotate further until the cog teeth 288 are in alignment with and engage the stops 286 in the second row. The spool subassembly 248 then comes to rest in this position with respect to the housing 214 for line trimming operations.

Referring to FIGS. 17–20, a third alternative embodiment is illustrated. In this embodiment, the spool 320 (shown in FIG. 20) comprises a molded-in pawl 322, which includes spring arms 324, 326, 328 supported at the respective base 330, 332, 334. The spring arms 324, 326, 328 include knobs 336, 338, 340, respectively, for engagement in the pockets 342, 344, 346, 348, 350, 352 which are integrally molded within the cog ring 356 (shown in FIG. 19). The spring arms 324, 326, 328 are molded such that they are supported only by the respective base 330, 332, 334 and are free to spring outward from the center of the spool 320 about the respective base 330, 332, 334. The respective base 330, 332, 334 of each spring arm 324, 326, 328 is supported by a support ring 360 which is also integrally molded on the spool 320.

Figure 17:
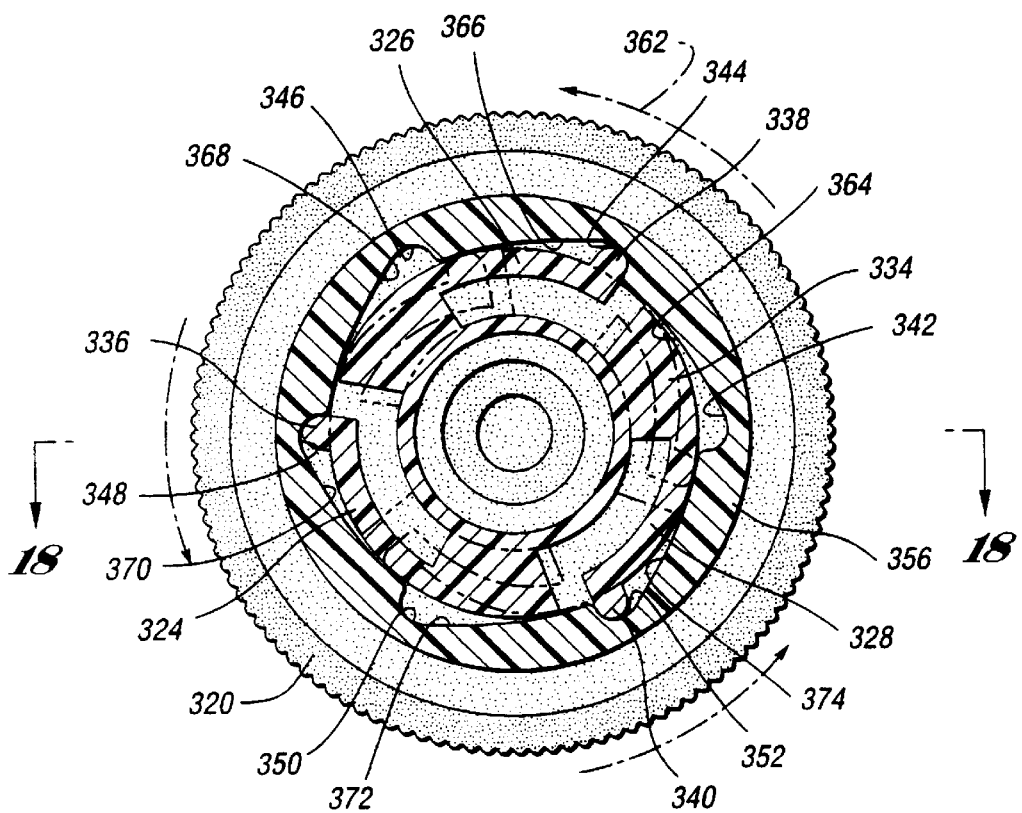
FIG. 17 shows a sectional view of a line trimmer head in accordance with a third alternative embodiment of the present invention.
Figure 18:
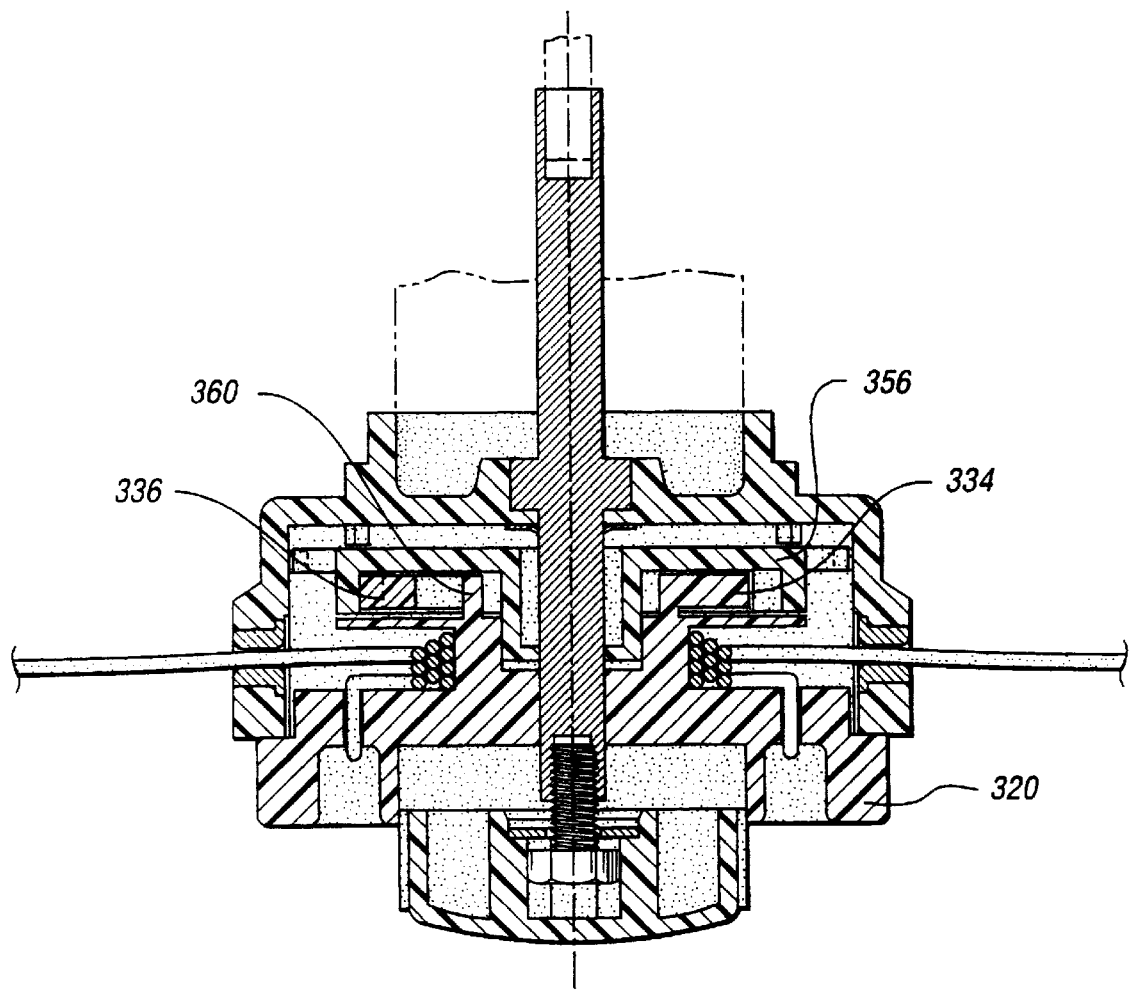
FIG. 18 shows a vertical cross-sectional view of the embodiment shown in FIG. 17 taken at line 18—18.
Figure 19:
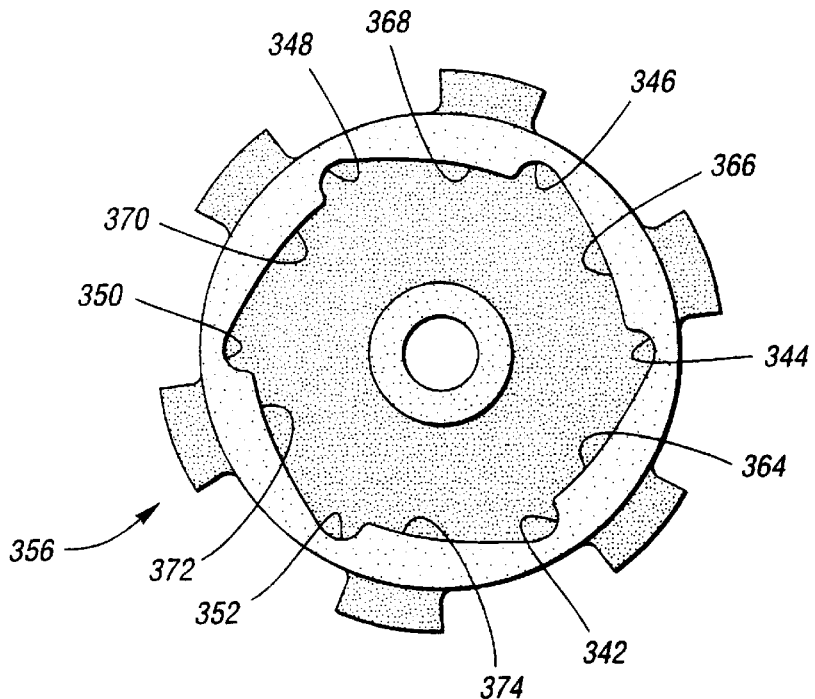
FIG. 19 shows a plan view of a cog ring in accordance with the embodiment shown in FIG. 17.
Figure 20:
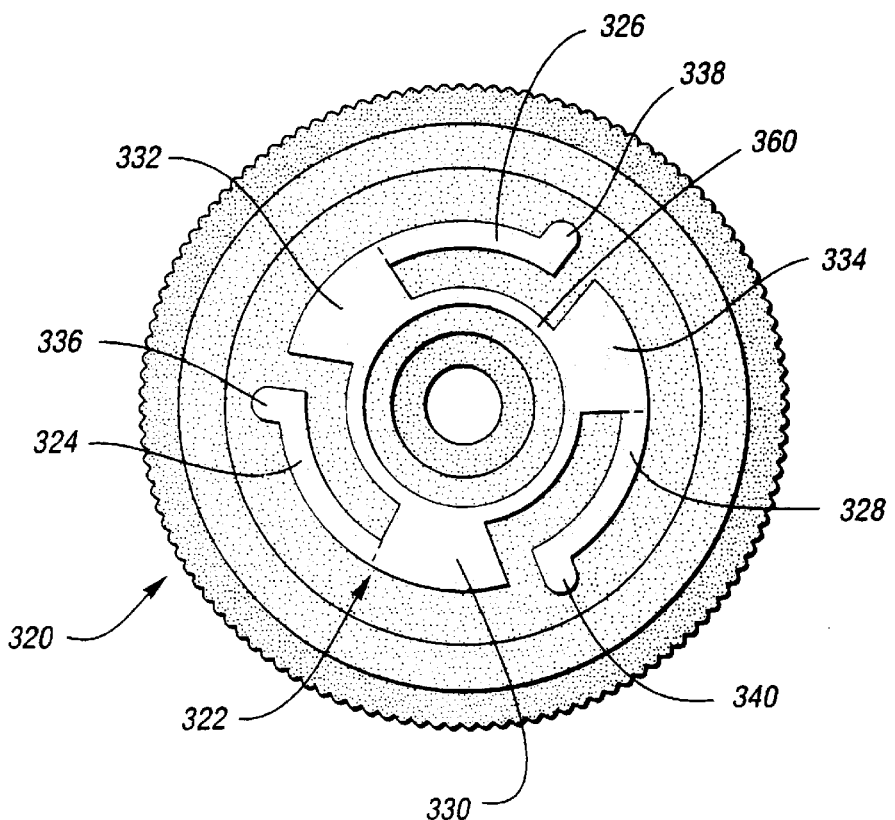
FIG. 20 shows a plan view of a spool in accordance with the embodiment shown in FIG. 17.

In this configuration, the spool 320 may be rotated in the direction indicated by arrows 362 in FIG. 17 for line-winding operations, but is prevented from rotating in the opposite direction by the knobs 336, 338, 340 engaging the pockets 348, 344, 352. As the spool 320 is rotated in the direction indicated by arrows 362, the arms 324, 326, 328 spring in as they travel up the ramps 364, 366, 368, 370, 372, 374, and return outward as they reach the pockets 342, 344, 346, 348, 350, 352 to prevent opposite rotation.

Accordingly, with this configuration, the separate pawl and spring assembly illustrated in FIG. 16 is eliminated. Of course, the molded-in spring arms 324, 326, 328 could comprise various configurations, so long as they are configured to have an outward spring bias.

While the best modes for carrying out the invention have been described in detail, those familiar with the art to which this invention relates will recognize various alternative designs and embodiments for practicing the invention. Thus the above described preferred embodiments are intended to be illustrative of the invention which may be modified within the scope of the following appended claims.

What is claimed is:

1. A line trimmer head, comprising:
a rotatable drive shaft,
a housing mounted to said drive shaft for rotation therewith, and having an open end and at least one peripheral aperture formed through the housing;
a spool including a flange, said flange being positioned at least partially within said housing adjacent said open end of said housing;
said spool forming a guide channel therethrough in communication with said peripheral aperture for receiving an end portion of a flexible line inserted through said peripheral aperture and for guiding said flexible line end portion through said spool to a position extending beyond said flange to facilitate securing said flexible line end portion with respect to said spool, whereupon the spool is windable within the housing for loading flexible line onto the spool without removing the spool from the housing.

2. The line trimmer head of claim 1, wherein said spool is axially secured with respect to said housing.

3. The line trimmer head of claim 1, wherein said spool is rotatable with respect to said housing to facilitate winding of the flexible line about said spool when said spool is positioned at least partially within said housing.

4. The line trimmer head of claim 3, further comprising a plurality of teeth extending from one of said spool and said housing and a pawl slidably mounted with respect to the other of said spool and said housing for selective cooperation with said teeth, whereby to allow rotation of said spool with respect to said housing in one direction and to selectively prevent rotation of said spool in an opposite direction with respect to said housing.

5. The line trimmer head of claim 4, further comprising a pawl actuator in cooperation with said pawl and extending beyond said spool to facilitate bumping of said actuator to allow rotation of said spool in said opposite direction with respect to said housing.

6. The line trimmer head of claim 1, further comprising at least one depression formed in said flange for cooperation with a finger for winding of the spool.

7. A line trimmer head, comprising:
a rotatable drive shaft;
a housing mounted to said drive shaft for rotation therewith, and having at least one peripheral opening formed through the housing;
a spool having at least one flange extending radially outwardly from the periphery thereof, said spool being positioned at least partially within said housing; and
said flange having at least one pair of holes formed therethrough in communication with each other and with said peripheral opening, whereby to receive sequentially a flexible line insertable into said housing through said peripheral opening and first through one of said pair of holes and then through the other of said pair of holes to secure said line with respect to said spool, whereupon the spool is windable within the housing for loading flexible line onto the spool without removing the spool from the housing.

8. The line trimmer head of claim 1 or 7, wherein said spool assembly includes a cog ring secured thereto, and said spool being rotatable in a first rotational direction with respect to the cog ring for winding line about the spool and fixed from rotation in a second direction opposite said first rotational direction to facilitate rotation of the spool and cog ring with the housing for line trimming operations.

9. A line trimmer head, comprising:
a rotatable drive shaft;
a housing mounted to said drive shaft for rotation therewith, and having an open end and at least one peripheral aperture formed through the housing;
a spool assembly including a spool having at least one flange extending radially outwardly from the periphery thereof, said spool being positioned at least partially within said housing adjacent said open end of said housing;
wherein said spool assembly includes a cog ring secured thereto, and said spool being rotatable in a first rotational direction with respect to the cog ring for winding line about the spool as the spool is positioned within the housing and fixed from rotation in a second direction opposite said first rotational direction to facilitate rotation of the spool and cog ring with the housing for line trimming operations.

10. The line trimmer head of claim 1 or 9, wherein said spool assembly includes a ratchet and pawl assembly formed between the cog ring and spool for facilitating rotation of the spool in the first rotational direction and preventing rotation of the spool in the second direction with respect to the cog ring.

11. The line trimmer head of claim 10, wherein said ratchet and pawl assembly comprises:

at least one pawl pivotally connected to said cog ring and spring-loaded with respect to the cog ring; and a ratchet member formed in said spool adjacent said cog ring, said ratchet member comprising a plurality of ramps and pockets for cooperation with said pawl for allowing said rotation of the spool with respect to the cog ring in a first direction while preventing rotation in said second direction.

12. The line trimmer head of claim 11, wherein said cog ring includes cog teeth, and said housing further comprises:

a base;

a cylindrical side wall portion;

a first row of stops positioned inside the housing where said base and side wall portions meet; and a second row of stops positioned inside said housing along said side wall portion and spaced from said base in a manner to allow bump-actuated indexing of said cog teeth between said first and second rows of stops for dispensing incremental amounts of line from the spool.

13. The line trimmer head of claim 1 or 9, wherein said flange comprises at least one pair of holes formed therethrough in communication with each other and with said peripheral aperture, whereby to sequentially receive a flexible line insertable into said housing through said peripheral aperture and first through one of said pair of holes and then through the other of said pair of holes to secure said line with respect to said spool.

14. The line trimmer head of claim 1 or 9, wherein said spool assembly includes a cog ring secured thereto, and said spool being rotatable in a first rotational direction with respect to the cog ring for winding line about the spool and fixed from rotation in a second rotational direction opposite said first rotational direction to facilitate rotation of the spool and cog ring with the housing for line trimming operations; and wherein said spool assembly further comprises a pawl integrally molded with one of said spool and cog ring and a ratchet member integrally molded with the other of the spool and cog ring for facilitating rotation of the spool in the first rotational direction and preventing rotation of the spool in the second rotational direction with respect to the cog ring.

15. The line trimmer head of claim 14, wherein said ratchet member comprises a plurality of ramps and pockets for cooperation with said pawl for allowing said rotation in the first direction with respect to the cog ring and preventing rotation in the second direction.

16. The line trimmer head of claim 15, wherein said cog ring includes cog teeth, and said housing further comprises:

a base;

a cylindrical side wall portion;

a first row of stops positioned inside the housing where said base and side wall portions meet; and a second row of stops positioned inside said housing along said side wall portion and spaced from said base in a manner to allow bump-actuated indexing of said cog teeth between said first and second rows of stops for dispensing incremental amounts of line from the spool.

17. The line trimmer head of claim 1 or 9, wherein said flange comprises at least one pair of holes formed therethrough in communication with each other and with said peripheral aperture, whereby to sequentially receive a flexible line insertable into said housing through said peripheral aperture and first through one of said pair of holes and then through the other of said pair of holes to secure said line with respect to said spool.

18. A line trimmer head, comprising:

a rotatable drive shaft;

a housing mounted to said drive shaft for rotation therewith, and having an open end and at least one peripheral aperture formed through the housing, said housing further including a base, and a cylindrical side wall portion;

a spool subassembly positioned at least partially within said housing adjacent said open end of said housing, the subassembly comprising:

a spool having at least one flange extending radially outwardly from the periphery thereof and a pawl integrally molded with the spool; and a cog ring secured to the spool and having a ratchet member integrally molded therein for cooperation with said pawl, said ratchet member comprising a plurality of ramps and pockets for cooperation with said pawl for allowing rotation of the spool in a first direction with respect to the cog ring to facilitate line winding as the spool is positioned within the housing while preventing rotation in a second direction opposite the first direction to facilitate line-feed bumping and line trimming operations.

* * * * *